US010745260B2

(12) United States Patent
Adamo (10) Patent No.: US 10,745,260 B2
(45) Date of Patent: Aug. 18, 2020

(54) WIRE RESTRAINING SYSTEM

(71) Applicant: Salvatore Adamo, Hicksville, NY (US)

(72) Inventor: Salvatore Adamo, Hicksville, NY (US)

(73) Assignee: Salvatore Adamo, Hicksville, NY (US)

( * ) Notice: Subject to any disclaimer, the term of this patent is extended or adjusted under 35 U.S.C. 154(b) by 310 days.

(21) Appl. No.: 15/650,189

(22) Filed: Jul. 14, 2017

(65) Prior Publication Data

US 2019/0016572 A1 Jan. 17, 2019

(51) Int. Cl.
*B66F 9/02* (2006.01)
*B66F 9/075* (2006.01)
*B65H 57/18* (2006.01)
*B65H 59/06* (2006.01)
(Continued)

(52) U.S. Cl.
CPC ............... *B66F 9/02* (2013.01); *B65H 57/18* (2013.01); *B65H 59/06* (2013.01); *B65H 59/22* (2013.01); *B66F 9/0759* (2013.01); *B66F 9/07509* (2013.01); *B66F 9/07559* (2013.01);
(Continued)

(58) Field of Classification Search
CPC ....... F16L 3/14; F16L 3/16; F16L 3/08; F16L 3/02; F16L 3/06; F16L 3/10; F16L 3/1008; F16L 3/105; F16L 3/1075; F16L 3/1091; B66C 1/16; B66C 1/18; B66C 1/12; B66C 1/125; B66C 3/12; B66C 5/00; B66C 5/02; B66C 5/025; B66C 5/10; B66F 19/00; B66F 19/005; B25B 1/14; B25B 1/103; B25B 1/20; B25B 1/205

USPC ....... 254/3 R, 4 R, 10 R, 325; 269/219, 220, 269/247, 246
See application file for complete search history.

(56) References Cited

U.S. PATENT DOCUMENTS 1,030,765 A * 6/1912 Bean ........................ B66C 23/48
254/325
1,259,942 A * 3/1918 Weaver .................... B66D 3/04
212/345
(Continued)

FOREIGN PATENT DOCUMENTS

CH                658896 A   * 12/1986   ................ F16L 3/10

OTHER PUBLICATIONS

"Slings and Tie-Downs." 2004. Caldwell. Catalog CA-5. <http://www.jrgindustries.com/assets/ca-5.pdf>. (Year: 2004).*
(Continued)

*Primary Examiner* — Orlando E Aviles
*Assistant Examiner* — Joel D Crandall
(74) *Attorney, Agent, or Firm* — Moritt Hock & Hamroff LLP; Bret P. Shapiro (57) ABSTRACT

Technologies are described for restraining systems. The systems may comprise a base, a stationary arm, a swing arm, a rod, first straps, and second straps. A bottom end of the stationary arm may be attached to a first end of the base. A bottom end of the swing arm may be attached at a second end of the base. The rod may be attached to top ends of the stationary arm and the swing arm. First straps may be attached to the stationary arm and configured to loop around and support an object. Second straps may be attached to the swing arm and configured to loop around and support the object. The rod may move and push the top of the swing arm away from the top of the stationary arm. A friction force between the first and second straps and the object may be effective to restrain the object.

18 Claims, 7 Drawing Sheets

(51) Int. Cl.
*B65H 59/22* (2006.01)
*H02G 3/32* (2006.01)

(52) U.S. Cl.
CPC .......... *H02G 3/32* (2013.01); *B65H 2701/34* (2013.01); *B66F 2700/09* (2013.01)

(56) References Cited

U.S. PATENT DOCUMENTS

| | | | | | |
|---|---|---|---|---|---|
| 1,379,313 | A | * | 5/1921 | Schneider | B66F 9/02 254/376 |
| 1,946,034 | A | * | 2/1934 | Ramsay | E21D 15/24 254/126 |
| 3,016,219 | A | * | 1/1962 | Murphy | F16L 1/0243 248/55 |
| 3,021,166 | A | * | 2/1962 | Kempel | B66C 1/20 280/762 |
| 3,871,621 | A | * | 3/1975 | Jackson | H02G 1/04 254/134.3 PA |
| 4,770,273 | A | * | 9/1988 | McMakin | B66B 9/16 182/102 |
| 4,934,675 | A | * | 6/1990 | Klocke | B25B 1/205 269/111 |
| 5,947,633 | A | * | 9/1999 | Foss | B66F 19/005 254/130 |
| 6,135,397 | A | * | 10/2000 | Santa Cruz | F16L 3/14 248/302 |
| 9,132,993 | B1 | * | 9/2015 | DiMartino | B66C 1/12 |
| 2003/0168647 | A1 | * | 9/2003 | Thompson | B66C 13/46 254/270 |
| 2012/0152870 | A1 | * | 6/2012 | Masters | F16L 3/14 211/60.1 |

OTHER PUBLICATIONS

"Utility poles." Jun. 6, 2014. Sizes.com. <https://www.sizes.com/materials/utilitypole.htm>. (Year: 2014).*

* cited by examiner

WIRE RESTRAINING SYSTEM

BACKGROUND

During construction of buildings, electrical wire may be pulled or dropped from a higher level to a lower level. Generally electrical wire comes in large spools and may be pulled vertically down a building from the spools. When the length of electric wire that is pulled is in excess of multiple stories, the length of electric wire that is pulled may weigh thousands of pounds and may weigh more than the wire remaining on the spool.

SUMMARY

In some examples restraining systems are described. The systems may comprise a base. The base may include a first end and a second end. The second end of the base may be spaced from the first end of the base so as to define a space between the second end of the base and the first end of the base. The systems may comprise a stationary arm. The stationary arm may include a top end and a bottom end. The bottom end of the stationary arm may be attached in a stationary position to the first end of the base. The systems may comprise a swing arm. The swing arm may include a top end and a bottom end. The bottom end of the swing arm may be attached at a pivot point at the second end of the base. The systems may comprise a rod. The rod may be attached to the top end of the stationary arm. The rod may be attached to the top end of the swing arm. The systems may comprise one or more first straps attached to the stationary arm. The first straps may be configured to loop around and support a first side of an object between the stationary arm and the swing arm. The systems may comprise one or more second straps attached to the swing arm. The second straps may be configured to loop around and support a second side of the object between the stationary arm and the swing arm. The rod may be configured to move and push the top of the swing arm away from the top of the stationary arm. A friction force between the first and second straps and the object may be effective to restrain the object.

In some examples, methods to restrain an electric wire are described. The methods may comprise securing a base to a surface. The base may include a first end and a second end. The second end of the base may be spaced from the first end of the base so as to define an opening between the second end of the base and the first end of the base. The methods may comprise attaching a stationary arm to the first end of the base. The methods may comprise attaching a swing arm to the second side of the base. The methods may comprise feeding an electric wire between first straps attached to the stationary arm and second straps attached to the swing arm. The first straps may loop around and support a first side of the electric wire and the second straps may loop around and support a second side of the electric wire. The methods may comprise moving a threaded rod attached to the stationary arm and the swing arm. A friction force between the first and second straps and the electric wire may be effective to restrain the electric wire.

In some examples, wire restraining systems are described. The systems may comprise a base. The base may include a first end and a second end. The second end of the base may be spaced from the first end of the base so as to define an opening between the second end of the base and the first end of the base. The systems may comprise a stationary arm. The stationary arm may include a top end and a bottom end. The bottom end of the stationary arm may be attached in a stationary position to the first end of the base. The systems may comprise a swing arm. The swing arm may include a top end and a bottom end. The bottom end of the swing arm may be attached at a pivot point at the second end of the base. The systems may comprise a threaded rod. The threaded rod may include a handle. The threaded rod may be attached to the top end of the stationary arm at a female threaded hub swivel. The threaded rod may be attached to the top end of the swing arm at a swivel push plate. The systems may comprise an electric wire. The systems may comprise one or more nylon webbing first straps attached to the stationary arm. The first straps may be configured to loop around and support a first side of the electric wire when the electric wire is fed between the stationary arm and the swing arm. The systems may comprise one or more nylon webbing second straps attached to the swing arm. The second straps may be configured to loop around and support a second side of the electric wire when the electric wire is fed between the stationary arm and the swing arm. The systems may comprise at least one support roller attached to the base. The support roller may support and guide the electric wire. The first straps and second straps may alternate along a length of the electric wire. The threaded rod may be configured to move and push the top of the swing arm away from the top of the stationary arm. A friction force between the first and second straps and the electric wire may be effective to restrain the electric wire.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

Figure 1:
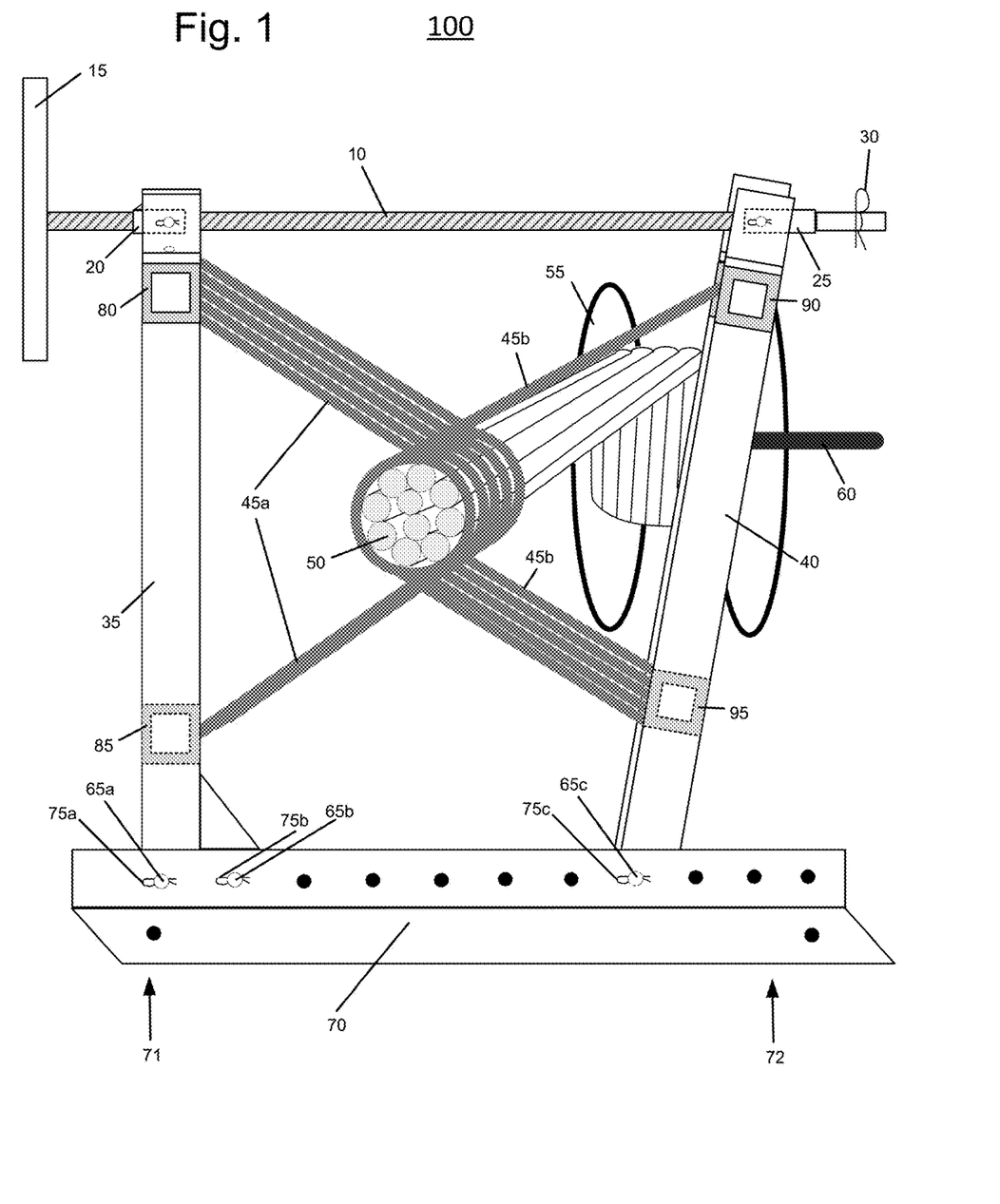
FIG. 1 is a front perspective view of a wire restraining system.

FIG. 1 is a front perspective view illustrating the components of a wire restraining system, arranged in accordance with at least some embodiments presented herein. As discussed in more detail below, a wire restraining system may allow a user to restrain and control a length of electric wire while pulling electric wire from a higher level to a lower level in a building.

Wire restraining system 100 may include a base 70, a stationary arm 35, a swing arm 40, a threaded rod 10 with a handle 15, and straps 45a, 45b. Base 70 may include a first end 71 and a second end 72. Stationary arm 35 may be attached to first end 71 of base 70 with two bolts 65a, 65b and two pins 75a, 75b at each side of bottom end of stationary arm 35 so that stationary arm 35 is attached to base 70 in a stationary position. Swing arm 40 may be attached to second end 72 of base 70. Second end 72 of base 70 may be spaced from first end 71 of base 70 so as to define an opening between second end 72 and first end 71. Swing arm 40 may be attached to the second end 72 of base 70 with one bolt 65c and pin 75c at each side of bottom end of swing arm 40 so that swing arm 40 pivots with respect to base 70 about a pivot point defined at bolt 65c.

Threaded rod 10 with handle 15 may be attached to stationary arm 35 at a female threaded hub swivel 20 at a top end of stationary arm 35. Threaded rod 10 with handle 15 may be attached to swing arm 40 at a swivel push plate 25 at a top end of swing arm 40. As described in more detail below, handle 15 of threaded rod 10 may turn clockwise to push a top of swing arm 40 away from a top of stationary arm 35 and pivot swing arm 40 about a pivot point defined at bolt 65c. Handle 15 of threaded rod 10 may turn counter-clockwise to pull top of swing arm 40 towards top of stationary arm 35 and pivot swing arm 40 on pivot point at bolt 65c.

Straps 45a may be attached to stationary arm 35 along top tube 80 of stationary arm 35 and bottom tube 85. Straps 45b may be attached to swing arm 40 at top tube 90 and bottom tube 95. An object may be between straps 45a and 45b such that straps 45a loop around and support a first side of the object and straps 45b loop around and support a second side of the object. For example, electrical wires 50 may be wrapped around a spool 55 supported by a support bar 60. Electric wires 50 may be pulled off spool 55 and fed between straps 45a and 45b such that straps 45a loop around and support a first side of electric wires 50 and straps 45b loop around and support a second side of electric wires 50. In order to prevent twisting of wires 50, straps 45a and 45b may total at least 3 straps, for example two straps 45a may be attached to stationary arm 35 such that a strap 45b attached to swing arm 40 is between the two straps 45a, or one strap 45a may be attached to stationary arm 35 between two straps 45b attached to swing arm 40. Stationary arm 35 and swing arm 40 may include additional alternated straps 45a and 45b respectively along the length of wire 50.

Tension of straps 45a and 45b around electric wires 50 may provide a friction force from straps 45a, 45b upon electric wires 50. Handle 15 of threaded rod 10 may, upon being turned clockwise, move threaded rod 10 to push top of swing arm 40 away from top of stationary arm 35 and pivot swing arm 40 on pivot point at bolt 65c to increase a tension of straps 45a and 45b and increase a friction force of straps 45a and 45b on electric wires 50. Handle 15 of threaded rod 10 may, upon being turned counter-clockwise, move threaded rod 10 to pull top of swing arm 40 towards top of stationary arm 35 and pivot swing arm 40 on pivot point defined at bolt 65c to decrease a tension of straps 45a and 45b and decrease a friction force of straps 45a and 45b upon electric wires 50. A friction force of straps 45a and 45b upon electric wires 50 may restrain wires and prevent electric wires 50 from moving, slipping, and/or pulling, all with respect to straps 45a and 45b. Tension of straps 45a and 45b and the friction force of straps 45a and 45b upon electric wires 50 may be set by adjusting a number of turns of handle 15 of threaded rod 10.

Figure 2:
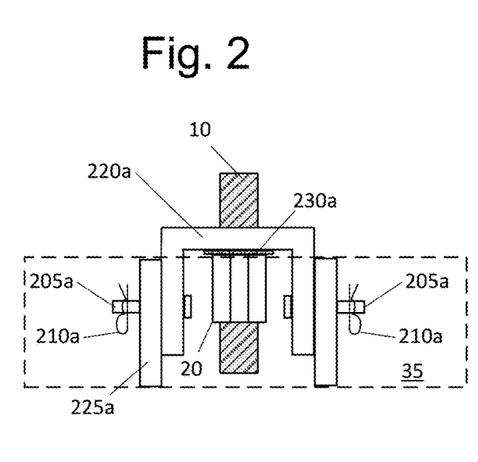
FIG. 2 is a top view of a female threaded hub swivel attachment between a threaded rod and a stationary arm of a wire restraining system.

FIG. 2 is a top view of a female threaded hub swivel attachment between a threaded rod and a stationary arm of a wire restraining system, arranged in accordance with at least some embodiments presented herein. Those components in FIG. 2 that are labeled identically to components of FIG. 1 will not be described again for the purposes of clarity.

Threaded rod 10 may be threaded through female threaded hub swivel 20. Female threaded hub swivel 20 may be welded to connection bracket 220a at weld 230a. Connection bracket 220a may be a steel bracket. Female threaded hub swivel 20 may allow threaded rod 10 to turn within female threaded hub swivel while female threaded hub swivel remains at a fixed position. Connection bracket 220a may be attached to anchor bracket 225a by two bolts 205a secured by lock pins 210a. Connection bracket 220a may pivot with respect to anchor bracket 225a at a pivot point defined by bolts 205a so that threaded bolt 10 may be aligned and thread through female threaded hub swivel 20. As shown in more detail below, anchor bracket 225a may be connected to stationary arm 35.

Figure 3:
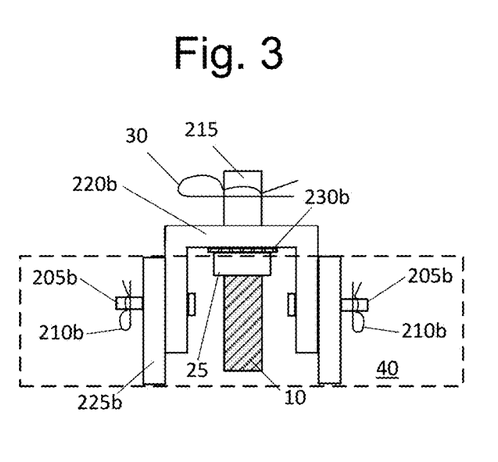
FIG. 3 is a top view of a swivel push plate attachment between a threaded rod and a swing arm of a wire restraining system.

FIG. 3 is a top view of a swivel push plate attachment between a threaded rod and a swing arm of a wire restraining system, arranged in accordance with at least some embodiments presented herein. Those components in FIG. 3 that are labeled identically to components of FIGS. 1-2 will not be described again for the purposes of clarity.

A non-threaded end 215 of threaded rod 10 may be welded to swivel push plate 25. Swivel push plate 25 may be in mechanical communication with connection bracket 220b. Connection bracket 220b may be a steel bracket. Non-threaded end 215 of threaded rod 10 may be secured to connection bracket 220b with lock pin 30. Connection bracket 220b may be attached to anchor bracket 225b by two bolts 205b secured by lock pins 210b. Bolts 205b may be removable and when bolts 205b are removed connection bracket 220b may be removable from anchor bracket 225b. Connection bracket 220b may pivot with respect to anchor bracket 225b at a pivot point defined by bolts 205b so that swivel push plate 25 may push against connection bracket 220b when threaded rod 10 is turned in a clock-wise direction. As shown in more detail below, anchor bracket 225b may be connected to swing arm 40.

Figure 4:
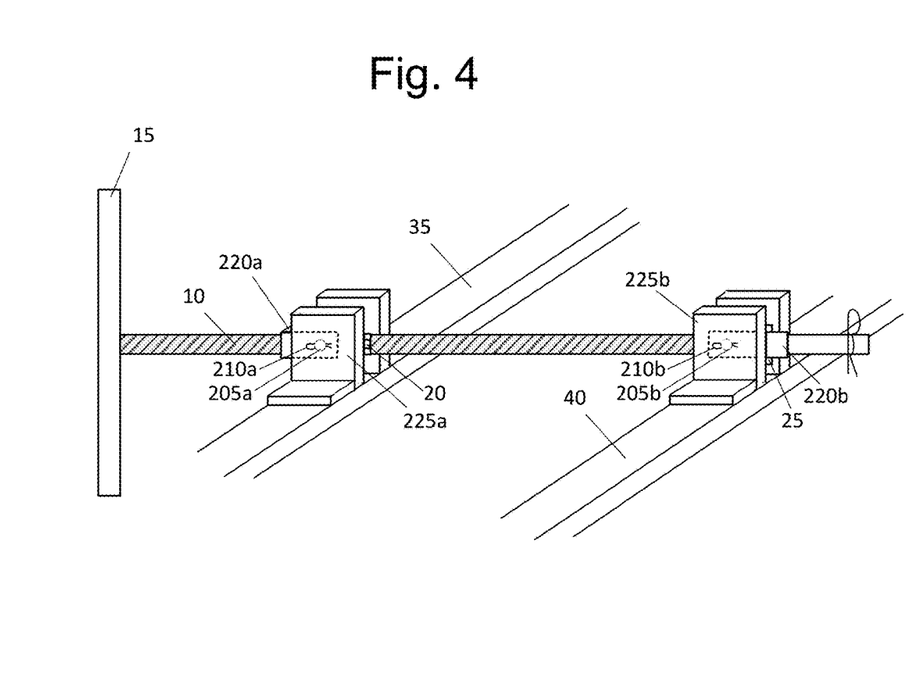
FIG. 4 is a front view of a threaded rod attached to a female threaded hub swivel of a stationary arm and a swivel push plate attachment of a swing arm a wire restraining system.

FIG. 4 is a front view of a threaded rod attached to a female threaded hub swivel of a stationary arm and a swivel push plate attachment of a swing arm a wire restraining system, arranged in accordance with at least some embodiments presented herein. Those components in FIG. 4 that are labeled identically to components of FIGS. 1-3 will not be described again for the purposes of clarity.

Threaded rod 10 with handle 15 may be attached to stationary arm 35 at female threaded hub swivel 20. As shown above, female threaded hub swivel 20 may be welded to connection bracket 220a and attached to anchor bracket 225a by bolts 205a secured by lock pins 210a. Threaded rod 10 with handle 15 may also be attached to swing arm 40 at swivel push plate 25 where non-threaded end 215 of threaded rod 10 may be secured to connection bracket 220b with lock pin 30. Connection bracket 220b may be attached to anchor bracket 225b by bolts 205b secured by lock pins 210b. Bolts 205a may be removable and when bolts 205a are removed connection bracket 220a may be removable from anchor bracket 225a. Threaded rod 10 may be removed from stationary arm 35 and swing arm 40 when connection bracket 220a and connection bracket 220b are removed from stationary arm 35 and sing arm 40 respectively.

Figure 5:
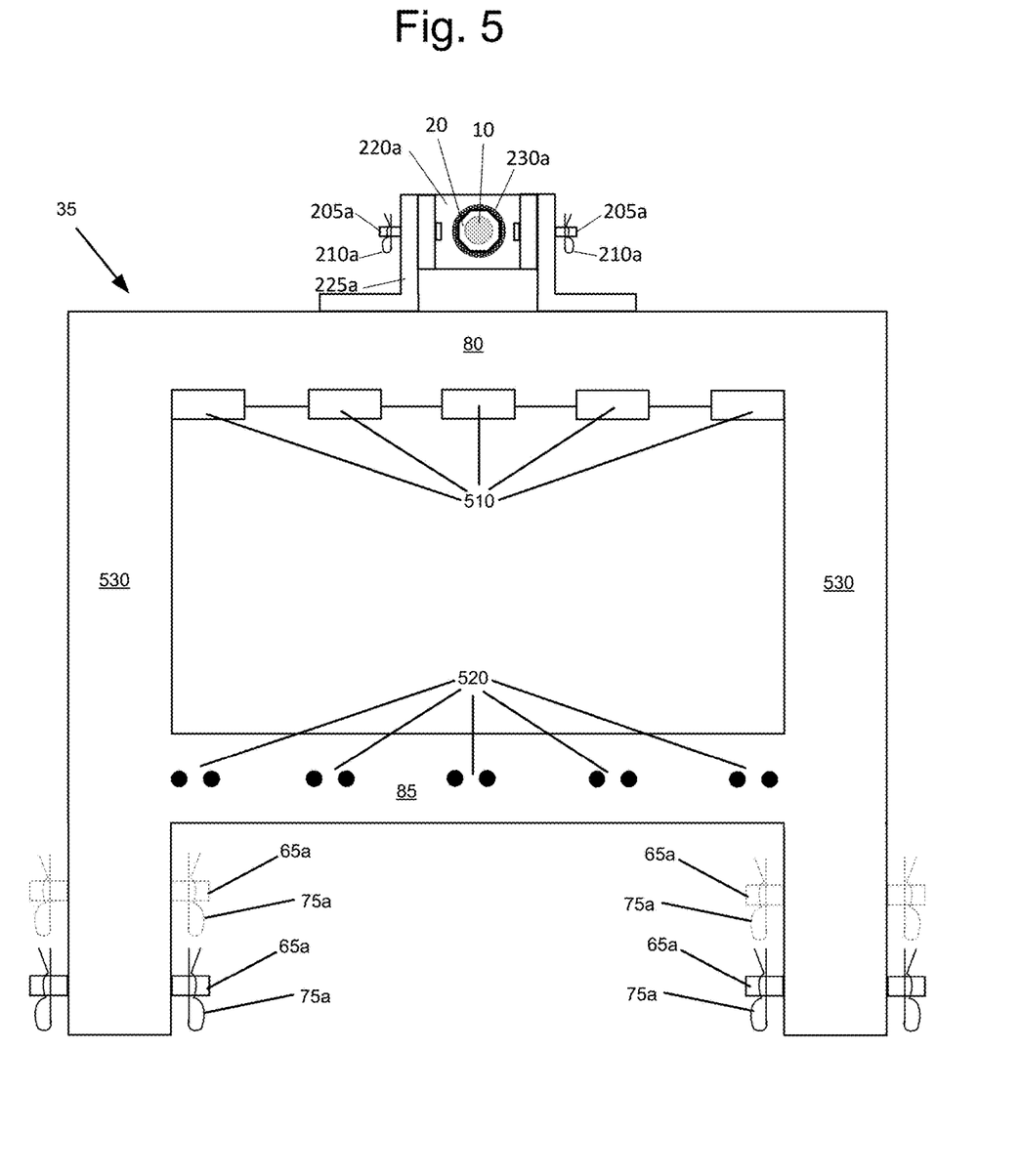
FIG. 5 is a side view of a stationary arm of a wire restraining system.

FIG. 5 is a side view of a stationary arm of a wire restraining system, arranged in accordance with at least some embodiments presented herein. Those components in FIG. 5 that are labeled identically to components of FIGS. 1-4 will not be described again for the purposes of clarity.

Stationary arm 35 may include top tube 80, bottom tube 85, and side tubes 530. Top tube 80, bottom tube 85, and side tubes 530 may each be 2 inch square by ⅛ inch thick tube stock steel. Stationary arm 35 may include anchor bracket 225a. Anchor bracket 225a may be attached to top tube 80. Anchor bracket 225a may be 90 degree angle steel welded upon top tube 80. Stationary arm 35 may include strap hooks 510. Strap hooks 510 may be welded to top tube 80. Stationary arm 35 may include walls defining strap mount holes 520. Strap mount holes 520 may be defined by walls of bottom tube 85 and may be located along bottom tube 85. As discussed in more detail below, straps may be attached to stationary arm 35 at strap hooks 510 and strap mount holes 520.

Figure 6:
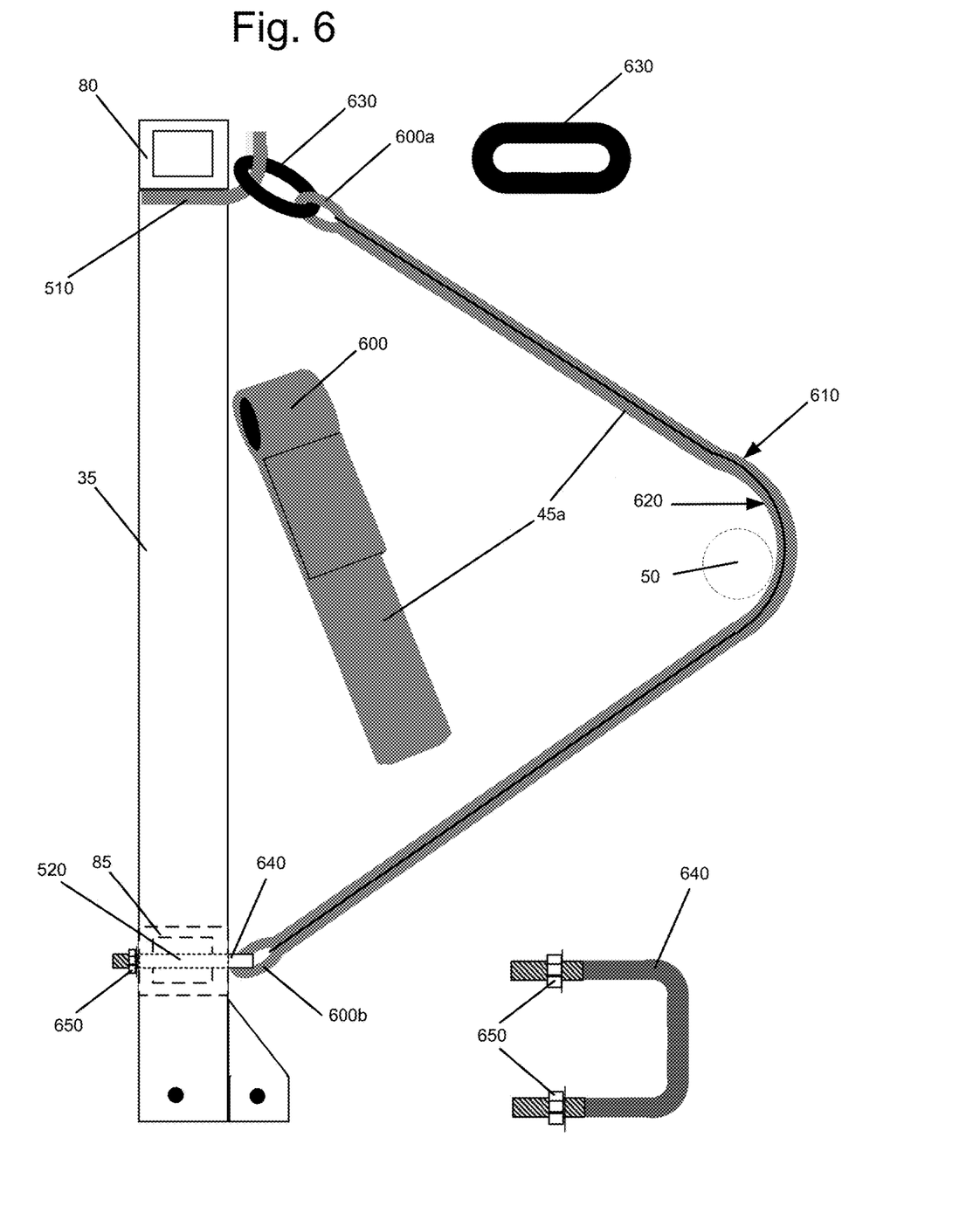
FIG. 6 is a front view of a stationary arm of a wire restraining system.

FIG. 6 is a front perspective view illustrating a stationary arm of a wire restraining system, arranged in accordance with at least some embodiments presented herein. Those components in FIG. 6 that are labeled identically to components of FIGS. 1-5 will not be described again for the purposes of clarity.

Straps 45a may include synthetic straps, nylon webbing, polyester webbing, polypropylene webbing, and rope. Straps 45a may have a width of 1-3 inches and a length of 2 to 4 feet. Straps 45a may have a weight rating of 3,000 to 10,000 pounds. Straps 45a may include a strap loop 600a at a first end of straps 45a and a strap loop 600b at a second end of straps 45a. Straps 45a may include a single layer of material or may include two layers of material including an outer layer 610 (layer facing away from stationary arm 35) and an inner layer 620 (layer facing toward stationary arm 35). In an example where strap 45a includes outer layer 610 and inner layer 620, inner layer 620 may be in contact with electric wire 50 and may absorb damage due to friction, while outer layer 610, may not be in contact with electric wire and may not be damaged by friction.

A first end of straps 45a may be attached to top tube 80 of stationary arm 35 at strap hook 510 and may be removable from strap hook 510. A metal strap ring 630 may be attached at loop 600a at first end of strap 45a. Metal strap ring 630 may be ⅜ to ½ inch steel and may have a width comparable to strap 45a (for example strap 45a may be a 2 inch wide nylon webbing strap and metal strap ring may have a width of 2 inches). Metal strap ring 630 may be attached to stationary arm 35 at strap hook 510. Strap hook 510 may have a width comparable to strap 45a and strap ring 630. Metal strap ring 630 may be removed from strap hook 510 when feeding wire 50 into wire restraining system 100 and metal strap ring 630 may be reattached to strap hook 510 when wire 50 has been fed into wire restraining system 100.

A second end of straps 45a may be attached to stationary arm 35 at strap mount holes 520 of bottom tube 85. A U-bolt 640 may be looped through strap loop 600b at second end of strap 45a and attached to stationary arm 35 at mount holes 520 of bottom tube 85. U-bolt 640 may be threaded through mount holes 520 and lock nuts 650 may be attached to threaded ends of U-bolt 640 to secure U-bolt 640 and strap 45a to stationary arm 35.

Figure 7:
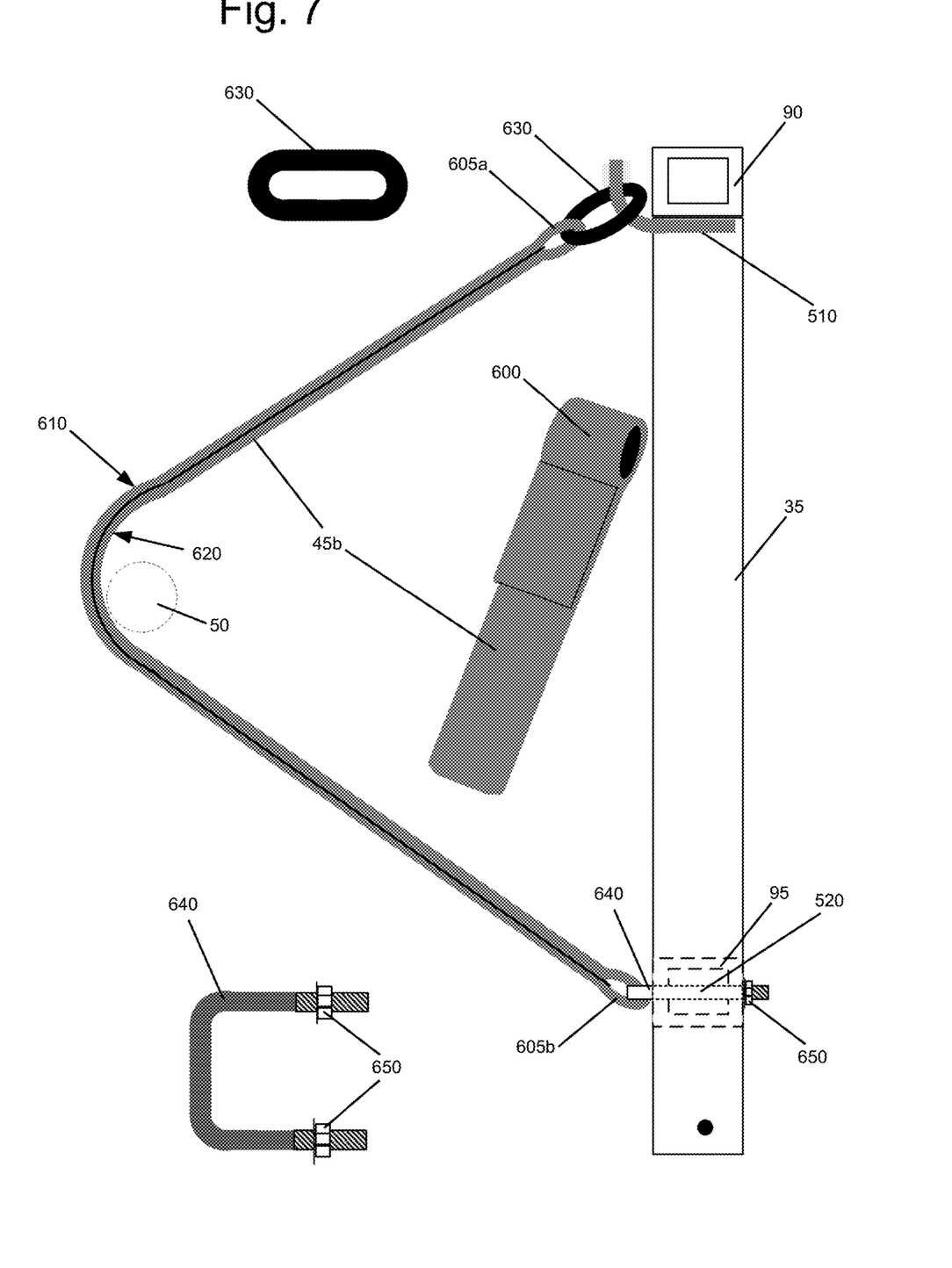
FIG. 7 is a front view of a swing arm of a wire restraining system.

FIG. 7 is a front perspective view illustrating a swing arm of a wire restraining system, arranged in accordance with at least some embodiments presented herein. Those components in FIG. 7 that are labeled identically to components of FIGS. 1-6 will not be described again for the purposes of clarity.

Straps 45b attached to swing arm 40 may act as a counterbalance to straps 45a attached to stationary arm 35. Straps 45b may include synthetic straps, nylon webbing, polyester webbing, polypropylene webbing, and rope. Straps 45b may have a width of 1 to 3 inches and a length of 2 to 4 feet. Straps 45b may have a weight rating of 3,000 to 10,000 pounds. Straps 45b may include a strap loop 605a at a first end of straps 45b and a strap loop 605b at a second end of straps 45b. Straps 45b may be a single layer thick or may be 2 layers thick including outer layer 610 (layer facing away from swing arm 40) and inner layer 620 (layer facing toward swing arm 40). In an example where strap 45b includes outer layer 610 and inner layer 620, inner layer 620 may be in contact with an electric wire and may absorb damage due to friction while outer layer 610 may not be in contact with electric wire and may not be damaged by friction.

A first end of straps 45b may be attached to top tube 90 of swing arm 40 at strap hook 510 and may be removable from strap hook 510. A metal strap ring 630 may be attached at strap loop 605a at the first end of strap 45b. Metal strap ring 630 may be ⅜ to ½ inch steel and may have a width comparable to strap 45b (for example strap 45b may be a 2 inch wide nylon webbing strap and metal strap ring may have a width of 2 inches). Metal strap ring 630 may be attached to swing arm 40 at strap hook 510. Strap hook 510 may have a width comparable to strap 45b and strap ring 630. Metal strap ring 630 may be removable from strap hook 510. Metal strap ring 630 may be removed from strap hook 510 when feeding wire 50 into wire restraining system 100 and metal strap ring 630 may be reattached to strap hook 510 when wire 50 has been fed into wire restraining system 100.

A second end of straps 45b may be attached to swing arm 40 at strap mount holes 520. A U-bolt 640 may be looped through strap loop 605b at second end of strap 45b and attached to swing arm 40 at mount holes 520 of bottom tube 95. U-bolt 640 may be threaded through mount holes 520 and lock nuts 650 may be attached to threaded ends of U-bolt 640 to secure U-bolt 640 and strap 45b to swing arm 40.

Figure 8:
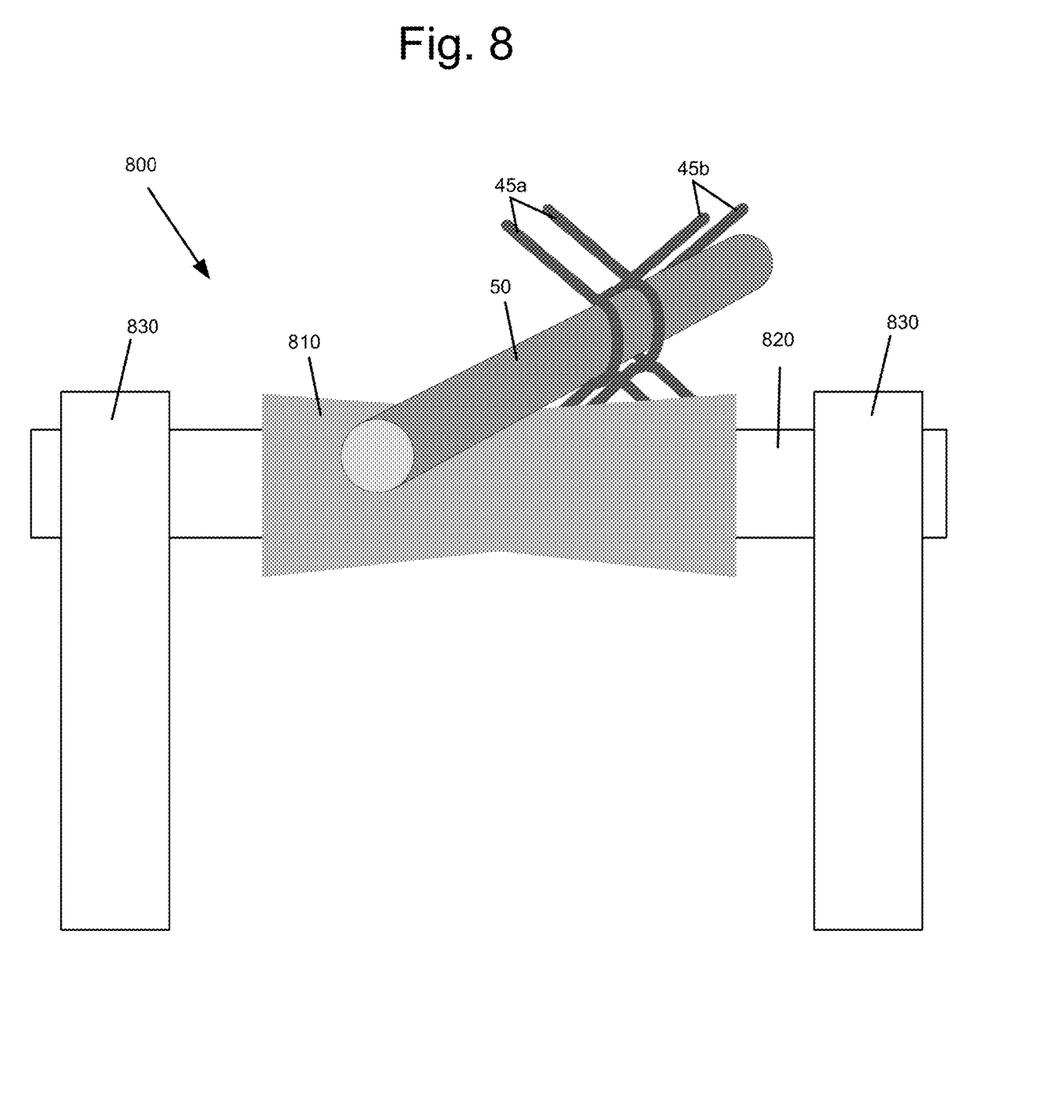
FIG. 8 is a front view of a support roller of a wire restraining system.

FIG. 8 is a front perspective view illustrating a support roller of a wire restraining system, arranged in accordance with at least some embodiments presented herein. Those components in FIG. 8 that are labeled identically to components of FIGS. 1-7 will not be described again for the purposes of clarity.

Wire restraining system 100 may further include one or more support rollers 800. One or more support rollers may support and guide electric wire entering and/or exiting straps 45a and 45b of wire restraining system 100. Support rollers 800 may include a roller 810 attached to an axel 820. Axel 820 may rotate within support legs 830 and allow roller 810 to rotate as wires move over roller 810. Roller 810 may be constructed of a material that will not damage electric wires such as rubber, high density polyethylene (HDPE), low density polyethylene (LDPE), acrylonitrile butadiene styrene (ABS), polycarbonate (PC), polypropylene (PP), and polystyrene (PS).

Figure 9:
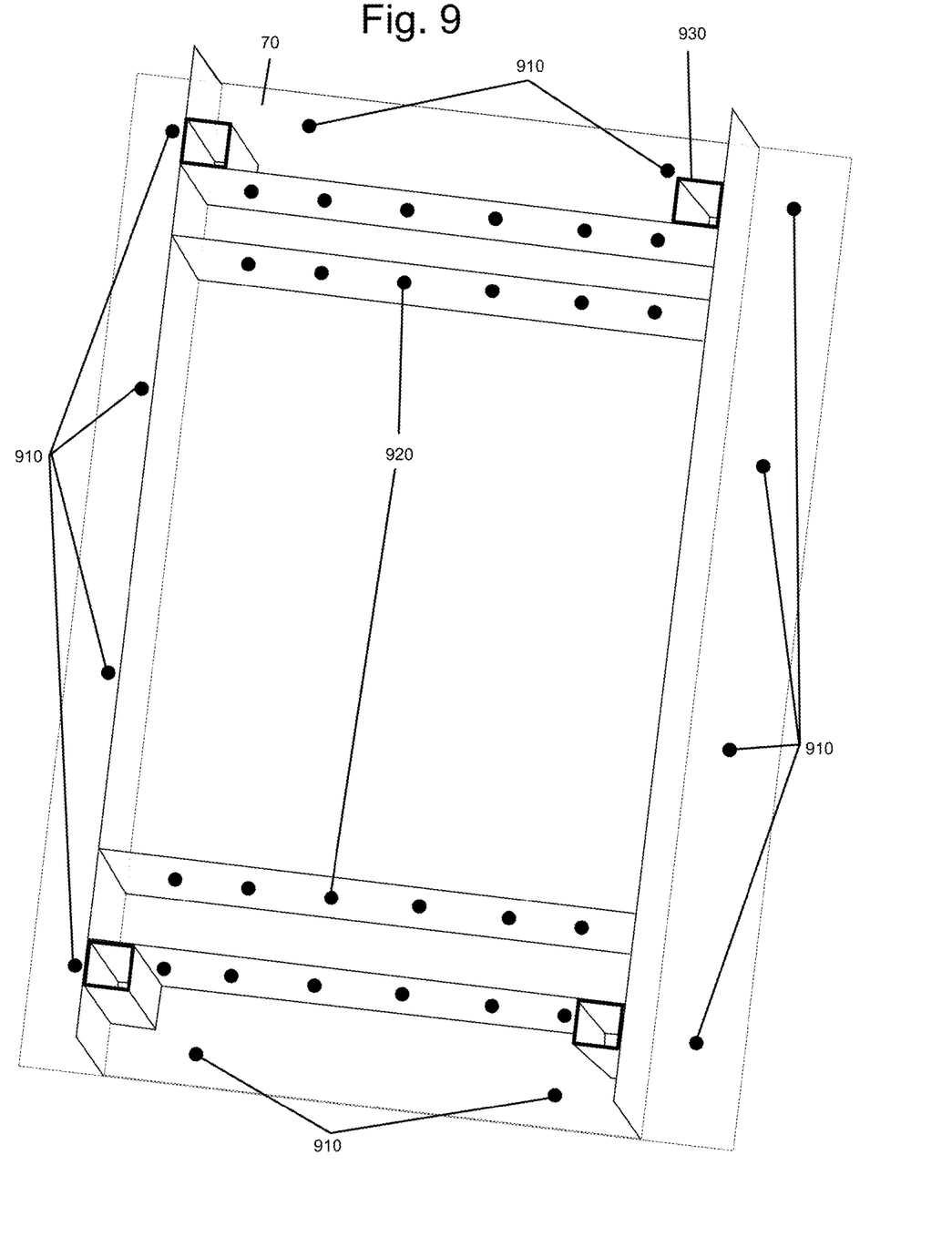
FIG. 9 is a top view of a base of a wire restraining system.

FIG. 9 is a top perspective view illustrating a base of a wire restraining system, arranged in accordance with at least some embodiments presented herein. Those components in FIG. 9 that are labeled identically to components of FIGS. 1-8 will not be described again for the purposes of clarity.

Base 70 of wire restraining system 100 may support and secure wire restraining system 100. Base 70 may be constructed from angle steel, steel tubing, and other steel welded together. Base 70 may include walls defining holes 910. Securing devices may be threaded through holes 910 to secure base 70 to a surface. Securing devices may include bolts, screws, nails, concrete anchors, etc. Base 70 may include walls defining holes 920. As detailed earlier, bolts 65a, 65b, 65c may be threaded through holes 920 to attach stationary arm 35 and swing arm 40 to base 70 and secured with pins 75a, 75b, 75c. Base 70 may include sockets 930 for securement of support roller 800. Support legs 830 of support roller 800 may slide into sockets 930 and be secured to base 70 by sockets 930.

In an example, a user of wire restraining system 100 may pull a multistory length of electric wire from a higher level to a lower level in a building. The user may secure base 70 to a surface at the higher level. The user may attach stationary arm 35 to a first end of the base. The user may attach swing arm 40 to a second end of the base. The user may unhook straps 45a from top tube 80 of stationary arm 35 by unhooking strap rings 630 (attached to straps 45a at loops 600a) from strap hooks 510 (attached to top bar 80). The user may unhook straps 45b from top tube 90 of swing arm 40 by unhooking strap rings 630 (attached to straps 45b at loops 605a) from strap hooks 510 (attached to top bar 90). A user may feed electric wire 50 between straps 45a attached to bottom bar 85 of stationary arm 35 and straps 45b attached to bottom bar 95 of swing arm 40. The user may hook strap rings 630 of straps 45a to strap hooks 510 attached to top bar 80 of stationary arm 35 such that straps 45a loop around and support a first side of electric wire 50. The user may hook strap rings 630 of straps 45b to strap hooks 510 attached to top bar 90 of swing arm 40 such that straps 45b loop around and support a second side of electric wire 50. A user may turn handle 15 of a threaded rod 10 attached to stationary arm 35 and swing arm 40 to increase a tension of straps 45a and straps 45b and increase a friction force of straps 45a and straps 45b on electric wire 50.

A system in accordance with the present disclosure may enable a user to safely control heavy lengths of electric wire when pulling heavy lengths of electric wire. A wire restraining system, as disclosed, may provide control of electric wire as the length and weight of the electric wire increases during a pull. A system in accordance with the present disclosure may restrain and control a length of electric wire during a pull without damaging the electric wire. A system in accordance with the present disclosure may allow a user to pull longer lengths of electric wire by controlling heavier weights of the length of electric wire than could be controlled by hand. A system in accordance with the present disclosure may allow a user to slow down or stop thousands of pounds of electric wire during a pull. A system in accordance with the present disclosure may allow for longer electric wire pull lengths and prevent the need for splices in the wires. Longer wire pulls without splices may allow a user to improve the quality of a finished installation.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A wire restraining system, the system comprising:
   a base, wherein the base includes a first end and a second end, and the second end of the base is spaced from the first end of the base so as to define a space between the second end of the base and the first end of the base;
   a stationary arm, wherein the stationary arm includes a top end and a bottom end and the bottom end of the stationary arm is attached in a stationary position to the first end of the base;
   a swing arm, wherein the swing arm includes a top end and a bottom end and the bottom end of the swing arm is attached at a pivot point at the second end of the base;
   a rod, wherein the rod is attached to the top end of the stationary arm and the rod is attached to the top end of the swing arm;
   one or more first straps attached to the stationary arm, wherein the first straps are configured to loop around and support a first side of an object between the stationary arm and the swing arm; and
   one or more second straps attached to the swing arm, wherein the second straps are configured to loop around and support a second side of the object between the stationary arm and the swing arm; and
   at least one support roller attached to the base, wherein the support roller supports and guides the object wherein the rod is configured to move and push the top end of the swing arm away from the top end of the stationary arm,
   wherein a friction force between each of the one or more first straps and the object is effective to restrain and control the object when the object is pulled from a higher level to a lower level;
   and wherein a friction force between each of the one or more second straps and the object is effective to restrain and control the object when the object is pulled from the higher level to the lower level.

2. The system of claim 1, wherein the object is an electric wire.

3. The system of claim 2, wherein the rod is a threaded rod and includes a handle and the threaded rod is attached to the top end of the stationary arm at a female threaded hub swivel.

4. The system of claim 3, wherein the threaded rod is attached to the top end of the swing arm at a swivel push plate.

5. The system of claim 1, wherein the first straps and the second straps include one or more of synthetic straps, nylon webbing, polyester webbing, polypropylene webbing, and rope.

6. The system of claim 5, wherein the first straps and the second straps include two layers of material, including a first inner layer of material and a second outer layer of material.

7. The system of claim 1, wherein the first straps and the second straps have a width of 1 to 3 inches, a length of 2 to 4 feet, and a weight rating of 3,000 to 10,000 pounds.

8. The system of claim 1, wherein:
a first end of each of the first straps is attached to the stationary arm at a respective first strap hook and each first strap is removable from the respective first strap hook; and
a first end of each of the second straps is attached to the swing arm at a respective second strap hook and each second strap is removable from the respective second strap hook.

9. A method to restrain and control an electric wire, the method comprising:
securing a base to a surface, wherein the base includes a first end and a second end, and the second end of the base is spaced from the first end of the base so as to define an opening between the second end of the base and the first end of the base;
attaching a stationary arm to the first end of the base;
attaching a swing arm to the second end of the base;
feeding an electric wire between first straps attached to the stationary arm and second straps attached to the swing arm, wherein the first straps loop around and support a first side of the electric wire and the second straps loop around and support a second side of the electric wire; and
moving a threaded rod attached to the stationary arm and the swing arm, wherein the threaded rod is attached to a top end of the stationary arm at a female threaded hub swivel, and
a friction force between each of the one or more first straps and the object is effective to restrain and control the object when the object is pulled from a higher level to a lower level;
and wherein a friction force between each of the one or more second straps and the object is effective to restrain and control the object when the object is pulled from the higher level to the lower level.

10. The method of claim 9, wherein the threaded rod is attached to a top end of the swing arm at a swivel push plate.

11. The method of claim 9, wherein the first straps and the second straps include one or more of synthetic straps, nylon webbing, polyester webbing, polypropylene webbing, and rope.

12. The method of claim 9, wherein the first straps and the second straps have a width of 1 to 3 inches, a length of 2 to 4 feet, and a weight rating of 3,000 to 10,000 pounds.

13. The method of claim 9, wherein the first straps and the second straps include a first inner layer of material and a second outer layer of material.

14. The method of claim 9, further comprising feeding the electric wire over least one support roller, wherein the support roller is attached to the base and the support roller guides the electric wire.

15. The method of claim 9, wherein:
a first end of each of the first straps is attached to the stationary arm at a respective first strap hook and each first strap is removable from the respective first strap hook;
a first end of each of the second straps is attached to the swing arm at a respective second strap hook and each second strap is removable from the respective second strap hook;
the method further comprising:
prior to feeding the electric wire between the first straps and the second straps:
removing the first end of each of the first straps from each respective first strap hook on the stationary arm and removing the first end of each of the second straps from each respective second strap hook on the swing arm; and
removing the threaded rod from the stationary arm and the swing arm; and
after feeding the electric wire between the first straps and the second straps:
attaching the first end of each of the first straps to each respective first strap hook on the stationary arm and attaching the first end of each of the second straps to each respective second strap hook on the swing arm; and
attaching the threaded rod to the stationary arm and the swing arm.

16. The method of claim 9 further comprising pulling the electric wire from a spool prior to feeding the electric wire between the first straps and the second straps.

17. A wire restraining system, the system comprising:
a base, wherein the base includes a first end and a second end, and the second end of the base is spaced from the first end of the base so as to define an opening between the second end of the base and the first end of the base;
a stationary arm, wherein the stationary arm includes a top end and a bottom end and the bottom end of the stationary arm is attached in a stationary position to the first end of the base;
a swing arm, wherein the swing arm includes a top end and a bottom end and the bottom end of the swing arm is attached at a pivot point at the second end of the base;
a threaded rod including a handle, wherein the threaded rod is attached to the top end of the stationary arm at a female threaded hub swivel, and the threaded rod is attached to the top end of the swing arm at a swivel push plate;
an electric wire;
one or more nylon webbing first straps attached to the stationary arm, wherein the first straps are configured to loop around and support a first side of the electric wire when the electric wire is fed between the stationary arm and the swing arm;
one or more nylon webbing second straps attached to the swing arm, wherein the second straps are configured to loop around and support a second side of the electric wire when the electric wire is fed between the stationary arm and the swing arm; and
at least one support roller attached to the base, wherein the support roller supports and guides the electric wire;
wherein the first straps and second straps alternate along a length of the electric wire, and the threaded rod is configured to move and push the top of the swing arm away from the top of the stationary arm wherein a friction force between each of the one or more first straps and second straps and the electric wire is effective to restrain and control the electric wire when the electric wire is pulled from a higher level to a lower level;

and wherein a friction force between each of the one or more second straps and the electric wire is effective to restrain and control the electric wire when the electric wire is pulled from the higher level to the lower level.

18. The system of claim 17, wherein:

a first end of each of the first straps is attached to the stationary arm at a respective first strap hook and each first strap is removable from the respective first strap hook; and a first end of each of the second strap is attached to the swing arm at a respective second strap hook and each second strap is removable from the respective second strap hook.

\* \* \* \* \*